US012765595B2

(12) United States Patent
Reevell

(10) Patent No.: US 12,765,595 B2
(45) **Date of Patent: *Oct. 20, 2026**

(54) AEROSOL-GENERATING DEVICES

(71) Applicant: Altria Client Services LLC, Richmond, VA (US)

(72) Inventor: Tony Reevell, London (GB)

(73) Assignee: Altria Client Services LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/620,319

(22) Filed: Mar. 28, 2024

(65) Prior Publication Data

US 2024/0237718 A1 Jul. 18, 2024

Related U.S. Application Data

(63) Continuation of application No. 18/165,570, filed on Feb. 7, 2023, now Pat. No. 11,969,010, which is a (Continued)

(30) Foreign Application Priority Data

Apr. 11, 2017 (EP) .................................... 17165887

(51) Int. Cl.

*A24F 40/40* (2020.01)
*A24F 40/10* (2020.01)

(Continued)

(52) U.S. Cl.

CPC .............. *A24F 40/40* (2020.01); *A24F 40/20* (2020.01); *A24F 40/30* (2020.01); *H02J 7/34* (2013.01); *A24F 40/10* (2020.01); *A24F 40/50* (2020.01)

(58) Field of Classification Search

CPC .......... A24F 40/20; A24F 40/30; A24F 40/40; A24F 40/50; A24F 40/10; H02J 7/34

See application file for complete search history.

(56) References Cited

U.S. PATENT DOCUMENTS

| | | | |
|---|---|---|---|
| 8,281,959 | B2 | 10/2012 | Luchinger |
| 10,111,468 | B2 | 10/2018 | Fornarelli |

(Continued)

FOREIGN PATENT DOCUMENTS

| | | | |
|---|---|---|---|
| CN | 105792688 | A | 7/2016 |
| CN | 106132222 | A | 11/2016 |

(Continued)

OTHER PUBLICATIONS

International Search Report and Written Opinion thereof dated May 8, 2018 for corresponding International Application No. PCT/EP2018/055962.

(Continued)

*Primary Examiner* — John J Norton
*Assistant Examiner* — Dilnessa B Belay
(74) *Attorney, Agent, or Firm* — Harness, Dickey & Pierce, P.L.C.

(57) ABSTRACT

An aerosol-generating device comprises a device housing comprising a first receiving chamber configured to receive and accommodate a first consumable and a second receiving chamber configured to receive and accommodate a second consumable. The device further comprises a power source in an internal space defined by the device housing and a controller configured to control aerosolization of an aerosol-forming substrate in a consumable in one of the first receiving chamber and in the second receiving chamber. At least the second receiving chamber includes electrical contacts configured to be detachably connected to a battery based on the separate power source being in the second receiving (Continued)

chamber such that the electrical contacts provide additional power from the separate power source to the aerosol-generating device.

14 Claims, 2 Drawing Sheets

Related U.S. Application Data continuation of application No. 15/949,415, filed on Apr. 10, 2018, now Pat. No. 11,596,179, which is a continuation of application No. PCT/EP2018/055962, filed on Mar. 9, 2018.

(51) Int. Cl.

| | |
|---|---|
| ***A24F 40/20*** | (2020.01) |
| ***A24F 40/30*** | (2020.01) |
| ***A24F 40/50*** | (2020.01) |
| ***H02J 7/34*** | (2006.01) |

(56) References Cited

U.S. PATENT DOCUMENTS

| | | | | |
|---|---|---|---|---|
| 11,083,225 | B2 | 8/2021 | Holzherr | |
| 11,969,010 | B2 * | 4/2024 | Reevell | A24F 40/40 |
| 2009/0133691 | A1 | 5/2009 | Yamada et al. | |
| 2012/0048266 | A1 | 3/2012 | Alelov | |
| 2013/0014772 | A1 | 1/2013 | Liu | |
| 2013/0333700 | A1 | 12/2013 | Buchberger | |
| 2014/0060556 | A1 | 3/2014 | Liu | |
| 2014/0366898 | A1 | 12/2014 | Monsees et al. | |
| 2015/0019655 | A1 | 1/2015 | Kizhakkiniyil et al. | |
| 2015/0090253 | A1 | 4/2015 | Farrow | |
| 2017/0020197 | A1 | 1/2017 | Cameron | |
| 2017/0033568 | A1 | 2/2017 | Holzherr | |
| 2017/0095002 | A1 | 4/2017 | Silvestrini | |
| 2017/0354180 | A1 | 12/2017 | Fornarelli | |
| 2018/0027883 | A1 * | 2/2018 | Zuber | H05B 6/108 |

FOREIGN PATENT DOCUMENTS

| | | | |
|---|---|---|---|
| CN | 106488714 | A | 3/2017 |
| CN | 106535680 | A | 3/2017 |
| JP | 2012-527222 | A | 11/2012 |
| JP | 2017-518733 | A | 7/2017 |
| KR | 10-2016-0145838 | A | 12/2016 |
| KR | 10-2016-0147253 | A | 12/2016 |
| RU | 2606072 | C2 | 1/2017 |
| RU | 2647252 | C1 | 3/2018 |
| WO | 2014/066730 | A1 | 5/2014 |
| WO | 2015/179388 | A1 | 11/2015 |
| WO | 2015190810 | A1 | 12/2015 |

OTHER PUBLICATIONS http://www.reuters.com/article/us-brit-am-tobacco-products-idUSKCN0T71U020151118 <https://protect-us.mimecast.com/s/CfRQC8201Wt662AnCnIDRa>.

http://jinjiatech.com/PRODUCTS/Heat/91 <https://protect-us.mimecast.com/s/fN-EC9rp1GUkkl6olEn8dH>.

International Preliminary Report on Patentability dated Oct. 15, 2019 for corresponding International Application No. PCT/EP2018/055962.

European Notice of Allowance dated Dec. 22, 2020 for corresponding European Application No. 18711868.2.

Search Report dated Aug. 16, 2021 received in corresponding Russian Application No. 2019131825, and the English-language translation thereof.

Decision on Grant dated Aug. 17, 2021 received in corresponding Russian Application No. 2019131825, and the English-language translation thereof.

Chinese Office Action dated Dec. 16, 2021 for corresponding Chinese Application No. 201880019135.9, and the English-language translation thereof.

Japanese Office Action dated Apr. 25, 2022 for corresponding Japanese Application No. 2019-555958, and English-language translation thereof.

Japanese Notice of Allowance dated Jan. 5, 2023 for corresponding Japanese Application No. 2019-555958, and English-language translation thereof.

ESR for European Patent 171655887.5-1656 dated Jul. 11, 2017.

Korean Office Action dated Feb. 27, 2023 for corresponding Korean Application No. 10-2019-7032561, and English-language translation thereof.

Korean Notice of Allowance and English translation thereof dated Oct. 26, 2023.

* cited by examiner

AEROSOL-GENERATING DEVICES

CROSS-REFERENCE TO RELATED APPLICATIONS

This application is a continuation of U.S. application Ser. No. 18/165,570, filed on Feb. 7, 2023, which is a continuation of U.S. application Ser. No. 15/949,415, filed on Apr. 10, 2018, which is a continuation of, and claims priority to, international application no. PCT/EP2018/055962, filed on Mar. 9, 2018, and further claims priority under 35 U.S.C. § 119 to European patent application Ser. No. 17/165,887.5, filed on Apr. 11, 2017, the entire contents of each of which are incorporated herein by reference.

BACKGROUND

Field

Some example embodiments relate to aerosol-generating devices (also called vapor-generating devices) suitable for being used with more than one consumable. In particular, some example embodiments relate to such aerosol-generating devices configured to provide additional power.

Description of Related Art

Aerosol-generating devices (also called vapor-generating devices), including so-called electronic cigarettes, are known to include more than one source configured to generate substances. For example, an evaporated liquid may be combined with heated tobacco. In another example, two different liquids may be provided for selective parallel evaporation. Devices comprising more than one consumable may become bulky when comprising a power source sufficiently large to provide the power required. Devices with smaller power sources may require frequent recharging. Some devices may be connected to a recharging system to charge the power source in the device, while the device is in use. However, such devices are connected via cables to the power source and may limit movement of an adult vaper using the device.

SUMMARY

According to some example embodiments, an aerosol-generating device, may include a device housing including a first receiving chamber configured to receive and accommodate a first consumable and a second receiving chamber configured to receive and accommodate a second consumable, an internal power source within an internal space defined by the device housing, and a controller configured to control aerosolization of an aerosol-forming substrate of at least one consumable. Each consumable of the at least one consumable may be in a separate chamber of the first receiving chamber and the second receiving chamber. The second receiving chamber may include electrical contacts configured to be detachably connected to a separate power source based on the separate power source being in the second receiving chamber such that the electrical contacts provide additional power from the separate power source to the aerosol-generating device.

The first receiving chamber may include additional electrical contacts configured to be detachably connected to the separate power source based on the separate power source being in the first receiving chamber.

The first receiving chamber may include the first consumable.

The controller may be configured to control a supply of power from the internal power source to a consumable in the first receiving chamber and control a separate supply of power from the separate power source to the consumable in the first receiving chamber.

The aerosol-generating device may further include a switch configured to selectively switch between supplying power to the first receiving chamber from the internal power source or from the separate power source.

At least one receiving chamber of the first receiving chamber or the second receiving chamber may include a heater configured to heat a consumable accommodated in the at least one receiving chamber.

At least one receiving chamber of the first receiving chamber or the second receiving chamber may include electrical contacts configured to connect the internal power source to an atomizer of a consumable in the at least one receiving chamber.

Dimensions of the first receiving chamber and dimensions of the second receiving chamber may be equal.

Dimensions of the first consumable and dimensions of the separate power source may be equal.

The electrical contacts configured to be detachably connected to the separate power source in the second receiving chamber may be further configured to connect the internal power source to an atomizer of a consumable based on the consumable being in the second receiving chamber.

The device housing may include a third receiving chamber configured to receive and accommodate a third consumable, and the third receiving chamber may include electrical contacts configured to be detachably connected to the separate power source based on the separate power source being in the third receiving chamber.

The first receiving chamber and the second receiving chamber may extend in parallel in the device housing.

The first receiving chamber and the second receiving chamber may be at opposite ends of the device housing.

The first receiving chamber and the second receiving chamber may be arranged in the device housing such that a longitudinal axis of the first receiving chamber and the second receiving chamber includes an alignment angle.

The aerosol-generating device may further include three or more receiving chambers arranged in a star-like pattern in the device housing, the three or more receiving chambers including the first receiving chamber and the second receiving chamber.

BRIEF DESCRIPTION OF THE DRAWINGS

Example embodiments are further described with regard to the following drawings, wherein.

In the figures, the same reference numbers are used for the same or similar elements.

DETAILED DESCRIPTION

Figure 1:
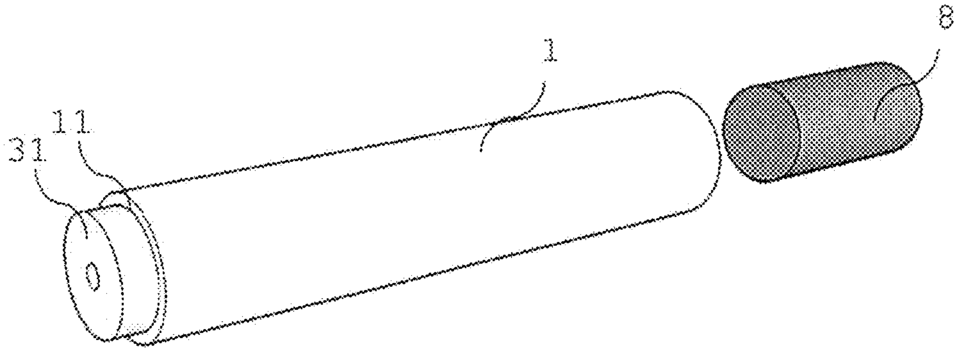
FIG. 1 is a perspective view of an aerosol-generating device comprising oppositely arranged consumable and separate battery, according to some example embodiments.

Example embodiments will become more readily understood by reference to the following detailed description of the accompanying drawings. Example embodiments may however, be embodied in many different forms and should not be construed as being limited to the example embodiments set forth herein. Rather, these example embodiments are provided so that this disclosure will be thorough and complete. Like reference numerals refer to like elements throughout the specification.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes," and/or "including," when used in this specification, specify the presence of stated features, integers, steps, operations, and/or elements, but do not preclude the presence or addition of one or more other features, integers, steps, operations, elements, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, regions, layers and/or sections, these elements, regions, layers and/or sections should not be limited by these terms. These terms are only used to distinguish one element, region, layer or section from another region, layer or section. Thus, a first element, region, layer or section discussed below could be termed a second element, region, layer or section without departing from the teachings set forth herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Some example embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these example embodiments should not be construed as limited to the particular shapes of regions illustrated herein, but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of this disclosure.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Unless specifically stated otherwise, or as is apparent from the discussion, term such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

As disclosed herein, the term "storage medium", "computer readable storage medium" or "non-transitory computer readable storage medium," may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, at least some portions of example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, processor(s), processing circuit(s), or processing unit(s) may be programmed to perform the necessary tasks, thereby being transformed into special purpose processor(s) or computer(s).

When the terms "about" or "substantially" are used in this specification in connection with a numerical value, it is intended that the associated numerical value include a tolerance of ±10% around the stated numerical value. The expression "up to" includes amounts of zero to the expressed upper limit and all values therebetween. When ranges are specified, the range includes all values therebetween such as increments of 0.1%. Moreover, when the words "generally" and "substantially" are used in connection with geometric shapes, it is intended that precision of the geometric shape is not required but that latitude for the shape is within the scope of the disclosure.

Some example embodiments provide aerosol-generating devices (also called vapor-generating devices) that provide a user (also called an adult vaper) with a choice in using more than one or different consumables and that provide additional power.

According to some example embodiments there is provided an aerosol-generating device comprising a device housing comprising a first receiving chamber for receiving and accommodating a first consumable and a second receiving chamber for receiving and accommodating a second consumable. The device further comprises an internal power source arranged in the device housing and a controller for controlling an aerosolization process of an aerosol-forming substrate comprised in a consumable arrangeable in the first and in the second receiving chamber. For example, the controller may control a power supplied from the internal power source, for example a power cell or a battery, to a receiving chamber. At least the second receiving chamber comprises electrical contacts detachably connected to a separate power source accommodated in the second receiving chamber. The separate power source, for example a power cell or a battery provides additional power to the aerosol-generating device via the electrical contacts.

The second receiving chamber is adapted ("configured") to receive a consumable for aerosol generation and is at the same time adapted to receive and accommodate a separate power source. The separate power source provides extra power to the device. Preferably, the separate power source is used for powering a consumable accommodated in the first receiving chamber. However, the additional power source may also be used for recharging the internal power source of the device.

Preferably, the first receiving chamber comprises electrical contacts detachably connectable to a separate power source when such a separate power source is accommodated in the first receiving chamber. The separate power source via the electrical contacts provides additional power to the aerosol-generating device. Thus, advantageously, also the first receiving chamber is adapted to receive a consumable for aerosol generation and is at the same time adapted to receive and accommodate a separate power source. Also, the separate power source in a first receiving chamber provides extra power to the device. Preferably, the separate power source in the first receiving chamber is an additional power source for operating a consumable accommodated in the second receiving chamber. However, the separate power source may also be used for recharging the internal power source of the device.

The aerosol-generating device is a hand-held device. In the device two, preferably different, consumables may be accommodated in the device. The consumables are in a state ready to be used by the adult vaper without further preparation of the device. For example, no repositioning of a mouthpiece is required if one of the consumables is selected for being used. In particular a switching between different consumables, for example between subsequent puffs (e.g., between separate draws of air through an airflow path of the aerosol-generating device by an adult vaper), may be available. In addition, the different receiving chambers may individually be used only for specific types of consumables. By this, a contamination through different consumables may be prevented.

The aerosol-generating device provides an adult vaper with the choice which consumable accommodated in the receiving chamber shall be used. Depending on the type of consumables provided in the receiving chambers a desired consumer experience may be selected spontaneously. For example, a spontaneous selection may be made between a flavor-based experience or a nicotine-based experience.

However, an adult vaper may decide to use one receiving chamber only for drawing air from the device and use a separate power source for prolonged use of the device. One receiving chamber may also spontaneously be used to provide additional power, for example in case of unintentional preliminary using up ("depletion") of the internal power source of the device.

In particular, the use of a separate, individual power source allows the adult vaper to use the device as usual without limitation of movement. In particular, no cables connecting the device to external power sources are present or needed. The separate power source is a wireless power source in the meaning of not needing a cable. This is the case, for example, with a separate power source in the form of a battery.

Preferably, no changes in size or in an overall appearance of the device are visible or required between use of the device with consumables only or with a separate power source instead.

Using a separate power source additionally to the internal power source of the device provides the adult vaper with a longer lasting device without having to recharge the device. In addition, an adult vaper has complete freedom of movement without being limited by a connection to a recharging device.

The separate power source may be a disposable or a rechargeable power source such as for example a disposable or rechargeable battery.

Preferably, the first receiving chamber comprises a first consumable, while the second receiving chamber comprises a separate power source.

The controller of the device is adapted to control a power supply from the internal power source to a consumable accommodated in the first receiving chamber. Preferably, the controller is adapted to control a power supply from the separate power source to a consumable accommodated in the first receiving chamber. If consumable and separate power source are switched and accommodated in different receiving chambers, a power supply is controlled to be directed accordingly from the power source to the consumable.

Preferably, a separate power source is not used for recharging the internal power source but directly to provide power to a receiving chamber or to a consumable arranged in said receiving chamber, respectively.

When being used as direct power supply, voltage, current and other power source parameters may, for example, be the same as for the internal power source. Separate power source requirement may also be reduced or a separate power source may be less powerful and thus more cost efficient.

For example, a separate power source used for a recharging of the internal power source needs a higher voltage output than a working voltage of the internal power source to allow a charging current to flow. Thus, a separate power source used for providing additional power only and direct use may have a same working or output voltage than the working voltage of the internal power source. The separate power source may also have a voltage lower than the working voltage of the internal power source. For example, a separate power source may have a voltage between the working voltage and a low-voltage protection value of the device.

A switching between a power supply from the internal to a separate power source may be performed and controlled, preferably, by the controller. For example, if the internal power source is used up and a low-voltage protection value is reached, automatic or manual switch between a power supply from the internal power source to a power supply from the separate power source may be performed. An indicator may be provided in the device to indicate that either a recharging of the device or the provision or activation of a separate power source is required.

Accordingly, the device preferably comprises a switch adapted to switch between a power supply from the internal power source to a, for example the first, receiving chamber and a power supply from the separate power source to that receiving chamber, for example, the first receiving chamber.

For aerosol generation, aerosol-forming substrate in a consumable may be atomized, for example by heat, vibration or other suitable means. If a substrate is heated, this may be done by heating the substrate via heating element in the consumable or by providing a heating element in the device, preferably in the receiving chamber.

At least the first receiving chamber or the second receiving chamber may comprise a heater for heating ("configured to heat") a consumable accommodated in the respective receiving chamber.

The internal power source may be coupled to a heating element in the device for heating aerosol-forming substrate in a consumable accommodated in a receiving chamber.

A power source may also be coupled to electrical contacts in a receiving chamber, which electrical contacts are connectable to an atomizer, for example a heater, in the consumable.

Advantageously, at least the first receiving chamber or the second receiving chamber comprises electrical contacts for connecting the internal power source to an atomizer of a consumable accommodated in the first or in the second receiving chamber.

Preferably, the same electrical contacts in a receiving chamber are used for powering an atomizer of a consumable and for contacting a separate power source.

Preferably, the first and the second receiving chamber comprise electrical contacts for contacting an atomizer in a consumable accommodated in the respective first and second receiving chamber.

Preferably, the electrical contacts detachably connected to the separate power source in the second receiving chamber are the same electrical contacts for connecting the internal power source to an atomizer of a consumable when accommodated in the second receiving chamber.

A separate power source accommodated in a receiving chamber instead of a consumable may be detachably coupled to the internal power source of the device. The separate power source may also be detachable coupled directly to a heating element in the device or to electrical contacts in another receiving chamber for coupling the separate power source to an atomizer of a consumable accommodated in the other receiving chamber than the separate power source.

Preferably, the separate power source is detachably coupled directly to a heating element in the device or to electrical contacts in another receiving chamber for coupling the separate power source to an atomizer of a consumable accommodated in the other receiving chamber than the separate power source.

A receiving chamber may comprise a heating element for heating a consumable accommodated in the receiving chamber or may comprise electrical contacts connectable to an external heating element of a consumable for heating said consumable accommodated in the respective receiving chamber. A receiving chamber may comprise both, a heating element and electrical contacts for example for an external atomizer. This provides many options for different consumables to be used with the aerosol-generating device. This also facilitates use of the device by not having to check if a receiving chamber is adapted for a specific consumable or aerosolization option only.

Examples of consumables are, for example, but not limited to: liquid containing cartridges or tank systems (also called "reservoirs") including or excluding an integrated aerosolization element such as for example cartomizers (also called "cartridges," a combined reservoir and atomizer); solid substrate containing consumables such as for example tobacco containing plugs; solid substrate containing capsules, wherein the solid substrate may be tobacco material, homogenized tobacco material or substrate in powder form; vaporizable wax; tobacco sheets that are gathered or crimped.

In some example embodiments, a tobacco material may include material from any member of the genus *Nicotiana*. In some example embodiments, the tobacco material includes a blend of two or more different tobacco varieties. Examples of suitable types of tobacco materials that may be used include, but are not limited to, flue-cured tobacco, Burley tobacco, Maryland tobacco, Oriental tobacco, rare tobacco, specialty tobacco, dark tobacco, blends thereof and the like. The tobacco material may be provided in any suitable form, including, but not limited to, tobacco lamina, processed tobacco materials, such as volume expanded or puffed tobacco, processed tobacco stems, such as cut-rolled or cut-puffed stems, reconstituted tobacco materials, blends thereof, and the like. In some example embodiments, the tobacco material is in the form of a substantially dry tobacco mass.

One or all receiving chambers may accommodate different types of consumables, for example a liquid containing reservoir and a solid substrate containing consumable, preferably a solid tobacco substrate containing consumable.

Different consumables may differ in shape, for example, in a diameter. Preferably, different consumables contain any one or a combination of different aerosol-forming substrate (also called a vapor-forming substrate), for example different tobacco material, different flavor, different nicotine content, different substance combination. Preferably, different consumables comprise a different way of being heated or in general a different way the substance of the consumable is atomized. Different consumables may comprise both different aerosol-forming substrate and a different way of atomizing the substrate.

The receiving chambers may comprise consumables of a same kind, for example liquid containing reservoirs. Preferably, the reservoirs then contain a different liquid, for example having different flavor or different substance combination.

The consumables may make use of different methods for releasing substances from the consumables. For example, when one consumable in the first receiving chamber comprises a heatable liquid, another consumable in the second receiving chamber may be a non-heated tobacco substrate or may contain a non-heated but otherwise atomized substrate.

Preferably, the device comprises a recognition mechanism to recognize, for example, the presence or absence of a consumable, the presence or absence of a separate power source or recognition of the type of consumable accommodated in a receiving chamber.

Preferably, the recognition mechanism is an electronic recognition coupled to the controller or directly integrated in the controller.

Preferably, dimensions of the first receiving chamber and dimensions of the second receiving chamber are equal. For example, both receiving chambers may have a same length or a same inner circumference, in particular a same inner diameter. Preferably, both receiving chambers have a same length and a same inner circumference, in particular a same inner diameter. Preferably, first and second receiving chamber are hollow cylinders having a circular cross section.

Preferably, dimensions of a consumable, for example of the first consumable, and dimensions of a separate power source are equal. For example, consumable and separate power source may have a same length, or may have a same outer circumference, in particular a same diameter.

Preferably, a consumable and a separate power source have a same circumference, in particular a same diameter.

Preferably, a consumable and a separate power source have a same length and a same circumference, in particular a same diameter. Preferably, a consumable and a separate power source are cylinders having a circular cross section.

Preferably, consumable and separate power source have same dimensions insofar that electrical contacts of a separate power source and electrical contacts of a consumable correspond or may contact the same electrical contacts of the same receiving chamber. Thus, preferably, geometry of consumable and separate power source are the same in a portion comprising electrical contacts for being connected to electrical contacts of a receiving chamber.

The aerosol-generating device may comprise at least one mouthpiece. The mouthpiece in a closed position covers at least a receiving opening of a receiving chamber, for example the first receiving chamber. The mouthpiece in the closed position covers a consumable, for example, the first consumable accommodated in the first receiving chamber.

The at least one mouthpiece may be completely disassembled or may only partly be removable from the housing for gaining access to the receiving chamber.

The at least one mouthpiece may be connected to the device housing. The mouthpiece may for example, be hingedly connected to the device housing (e.g., connected via a hinge). The mouthpiece may be detachably connected to the device housing. A mouthpiece may be connectable to the device housing to cover either the first or the second receiving chamber. The device may comprise several mouthpieces for covering several, preferably all receiving chambers of the device.

The device housing of the aerosol-generating device may comprise a third or further receiving chamber for receiving and accommodating a third or further consumable. The third or further receiving chamber may comprise electrical contacts detachably connectable to a separate power source when accommodated in the third or further receiving chamber. The separate power source via the electrical contacts provides additional power to the aerosol-generating device.

The third or further receiving chamber may comprise electrical contacts detachably connectable to a consumable when accommodated in the third or further receiving chamber. The separate power source via the electrical contacts may provide additional power to the consumable.

Preferably, the controller controls an aerosolization (also called vaporization) process of an aerosol-forming substrate comprised in a consumable arranged in the third or further receiving chamber.

Where more than two receiving chambers are provided in the device housing, more than one, for example two, receiving chambers may be used for accommodating a separate power source. Where more than two receiving chambers are provided in the device housing, for example all but one receiving chamber may be used for accommodating a separate power source. Thus, for example, only one receiving chamber may be used for accommodating a consumable, while all other receiving chambers are used for accommodating a separate power source.

The first receiving chamber and the second receiving chamber may be arranged side-by-side in the device housing. The first and the second receiving chamber are preferably arranged parallel and next to each other in the device housing. The first and second receiving chamber may be arranged in a line next to each other.

The first receiving chamber and the second receiving chamber may also be arranged at opposite ends of the device housing. The device may comprise a longitudinal device housing, for example a rod-like housing. The first receiving chamber may be arranged at and accessible from one longitudinal end of the device and the second receiving chamber may be arranged at and accessible from the opposite longitudinal end of the device.

The receiving chambers may also be arranged in a closed packed manner. For example, three receiving chambers may be arranged in a triangle or four receiving chambers may be arranged in the form of a parallelepiped.

In some example embodiments, each receiving chamber may be elongate and have a longitudinal axis. The at least two receiving chambers may be arranged next to each other in the device housing with their longitudinal axes in parallel. 'Arranged parallel' is herein meant that a longitudinal axis of the receiving chambers is arranged parallel. The longitudinal axis is typically arranged along an insertion direction of a consumable or of a separate power source into the receiving chamber. Receiving chambers arranged parallel and next to each other have their receiving openings directing in a same direction such that the receiving chambers may be filled from a same, for example top, direction.

The first and second receiving chamber may be arranged in the device housing such that the longitudinal axes of the two receiving chambers collectively define ("include") an alignment angle. The alignment angle is larger than 0 degree.

An alignment angle may be the same or may be different between neighboring receiving chambers. Thus, receiving chambers may be arranged symmetrically or asymmetrically in the device housing.

Preferably, an alignment angle is the same between all receiving chambers in the device.

Preferably, an alignment angle is between 30 degree and 180 degree for two receiving chambers, for example between 45 degree and 90 degree. An alignment angle of 180 degree with two receiving chambers corresponds to an opposite arrangement (opposite insertion directions) of the two receiving chambers in the device housing.

Preferably, three receiving chambers are arranged such as to include an alignment angle of between 30 degree and 150 degree. Preferably, three receiving chambers are arranged such as to include an alignment angle of 120 degree between neighboring receiving chambers.

The receiving chambers may be arranged in a same plane. The receiving chambers may be arranged in different planes, for example in planes parallel to each other or in a cone-shaped manner.

Preferably, all receiving chambers lie in one plane.

Preferably, three or more receiving chambers are arranged in a star-like manner in the device housing.

Preferably, the proximal ends of the first and second receiving chamber or the receiving openings of the first and second receiving chamber are arranged flush with a top or with an outer circumference of the device housing. If the receiving chambers are all arranged next to each other in one line then the receiving openings of the receiving chambers are preferably arranged flush with a top of the device housing. If the receiving chambers are arranged including an alignment angle in between neighboring receiving chambers, then the receiving openings of the receiving chambers are preferably arranged flush with a circumference of the device housing.

Preferably, the device housing comprises two or three receiving chambers for receiving and accommodating two or three consumables. Preferably, at least one of the two or three receiving chambers, more preferably, all of the two or three receiving chambers are adapted to receive a separate power source.

A consumable or a separate power source may partially or entirely be inserted into a receiving chamber. A partial insertion facilitates the removal of the consumable or of the separate power source after use. Thereby, an adult vaper may grip an extending portion of the consumable or of the separate power source.

Removal of a consumable or of a separate power source from a receiving chamber may also be facilitated by the provision of cutouts in the device housing that enable a gripping of the consumable or of the separate power source. Preferably, two oppositely arranged cutouts are provided in a receiving chamber.

The device housing may be provided with cutouts in an opening portion of a receiving chamber.

All opening portions of all receiving chambers in the device may be provided with cutouts.

FIG. 1 shows an aerosol-generating device comprising a tubular-shaped device housing 1 having a circular cross-section. The device housing 1 comprises two receiving chambers 11 (e.g., a first receiving chamber configured to receive and accommodate a first consumable and a second receiving chamber configured to receive and accommodate a second consumable) in the form of hollow cylinders. The two receiving chambers are arranged at opposite longitudinal ends of the device housing 1 and are each accessible from said longitudinal ends. Only a first receiving chamber 11 is visible in FIG. 1.

Figure 2:
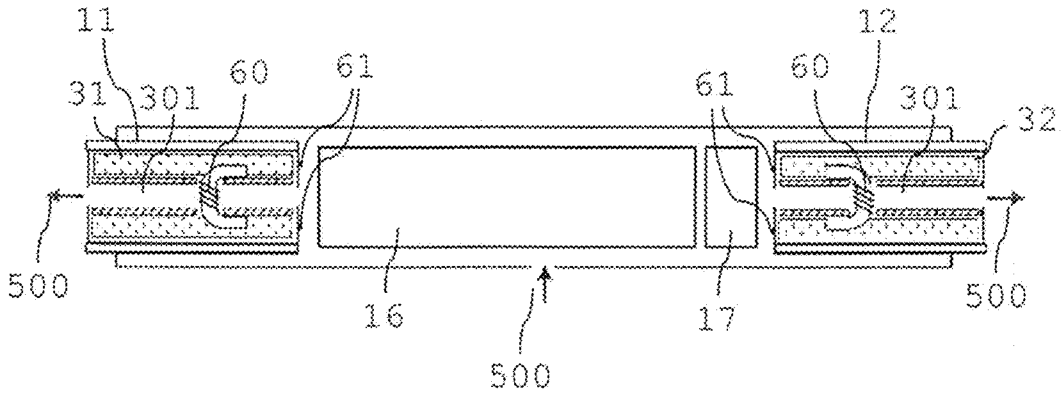
FIG. 2 shows a cross section of a device, for example of FIG. 1, comprising two consumables, according to some example embodiments.

The device housing 1 comprises an internal power source 16 (not shown in FIG. 1), for example an internal battery, arranged in between the first and second receiving chamber within an internal space defined by the device housing 1, as shown in at least FIG. 2. The internal power source 16 is coupled to a first consumable 31 accommodated in the first receiving chamber 11. Power from the internal power source is, for example, provided via electrical contacts in the receiving chamber to the first consumable 31 for heating or for generally atomizing (also called "vaporizing") an aerosol-forming substrate in the consumable 31. The internal power source is also connected to the second receiving chamber, preferably also via electrical contacts arranged in the receiving chamber, for supplying power to a consumable when accommodated in the second receiving chamber.

The first consumable 31, for example, a heatable aerosol-forming liquid containing cartridge such as a cartomizer where an atomization source is incorporated in the cartridge, is accommodated in the first receiving chamber. The first consumable 31 extends from the receiving chamber.

In FIG. 1, an external battery 8 to be inserted and accommodated in the second receiving chamber is shown in a yet to be inserted state in FIG. 1. For additional power, the battery 8 may be inserted into the device. Energy from the battery may be provided to an atomizer, for example, a heating element in the consumable 31 accommodated in the first receiving chamber.

FIG. 2 schematically shows a cross section through an aerosol-generating longitudinal device comprising two oppositely arranged receiving chambers 11, 12, for example, the device shown in FIG. 1.

The device comprises an internal power source 16 within an internal space defined by the device housing 1 and a controller 17 configured to control the internal power source and the device. In FIG. 2 a consumable 31, 32 each is arranged in the two receiving chambers 11, 12. The controller 17 may be configured to control aerosolization of an aerosol-forming substrate of the consumable 31 in the first receiving chamber 11 and the consumable 32 in the second receiving chamber 12. The two consumables are of a same ("common") type. The two consumables 31, 32 are a heated liquid containing reservoir. An aerosol-forming liquid is contained in a hollow tubular shaped reservoir. The liquid is supplied by a wick material to a coil heater 60, where the liquid is heated and evaporated. In a central conduit 301 of the consumables, the evaporated liquid is led out of the receiving chamber.

The device housing 1 is provided with a centrally arranged opening in the device housing side wall for an airflow 500 to enter the device housing in about a middle of the housing. The airflow then passes along the device housing into the direction of the opposite ends, to the distal ends of the consumables 31, 32 and passes the consumables through the central conduits 301.

The two consumables preferably differ in terms of at least one of nicotine strength, flavor or vapor volume. The two consumables 31, 32 slightly extend from the device housing.

The receiving chambers 11, 12 comprise electrical contacts 61 for providing ("configured to provide") power from the power source 16 to the coil heater 60 of the consumables 31, 32.

The controller 17 is adapted ("configured") to control the heating of aerosol-forming substrate in the consumables. In particular, the controller 17 is adapted to control an energy supply from the internal power source 16 to the consumables 31, 32.

Figure 3:
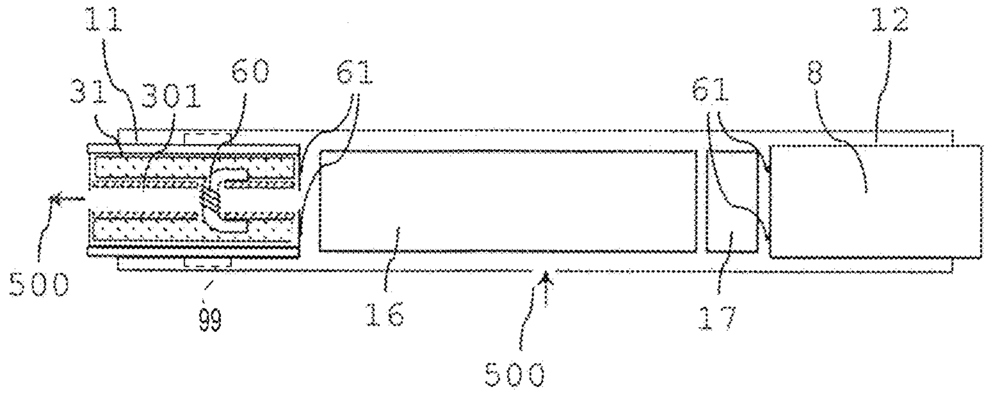
FIG. 3 shows a cross section of the device of FIG. 2 comprising a consumable and a separate battery, according to some example embodiments.

FIG. 3 shows the device of FIG. 2, wherein the second consumable 32 is replaced by a battery 8. Via the electrical contacts 61 in the second receiving chamber 12 and according wiring in the device, the battery 8 is directly connected to the electrical contacts 61 of the first receiving chamber 11 for supplying power to the first consumable 31.

Restated, at least the second receiving chamber 12 includes electrical contacts 61 configured to be detachably connected to a separate power source (e.g., battery 8) based on the separate power source being in the second receiving chamber 12, such that the electrical contacts 61 provide additional power from the separate power source (battery 8) to the aerosol-generating device (e.g., to consumable 31 in the first receiving chamber 11 via the electrical contacts 61 in the first receiving chamber 11).

As shown in FIGS. 2-3, the first receiving chamber 11 may include additional electrical contacts 61 configured to be detachably connected to the separate power source (e.g., battery 8) based on the separate power source being in the first receiving chamber 11.

As shown in FIGS. 2-3, dimensions of the first receiving chamber 11 and dimensions of the second receiving chamber 12 may be equal. In addition or in alternative, dimensions of the first consumable 31 and dimensions of the separate power source (e.g., battery 8) may be equal.

The first consumable 31 and the battery 8 slightly extend from the device housing.

The controller 17 is adapted to control a power supply from the battery 8 to the first consumable 31. The controller 17 is also adapted to switch from a power supply from the internal power source to the first consumable to a power supply from the battery 8 to the first consumable.

For example, the controller 17 may be configured to control a supply of power from the internal power source 16 to a consumable 31 in the first receiving chamber 11 and may be further configured to control a separate supply of power from the separate power source (e.g., battery 8) in the second receiving chamber 12 to the consumable 31 in the first receiving chamber 11, in addition or in alternative to the supply of power from the internal power source 16.

To this end, the controller 17 and/or the aerosol-generating device may include a switch configured to selectively switch between supplying power to the first receiving chamber 11 from the internal power source 16 or from the separate power source (e.g., battery 8). For example, the controller 17 may be configured to selectively switch between supplying power to the first receiving chamber 11 from the internal power source 16 or from the separate power source (e.g., battery 8).

As shown in FIG. 3, the electrical contacts 61 in at least the first receiving chamber 11 and/or the second receiving chamber 12 may be configured to connect the internal power source 16 to an atomizer of a consumable (e.g., first consumable 31) in the at least one receiving chamber (e.g., first receiving chamber 11).

As further shown in FIGS. 2-3, the electrical contacts 61 configured to be detachably connected to the separate power source (e.g., battery 8) in the second receiving chamber 12 may be further configured to connect the internal power source 16 to an atomizer of a consumable (e.g., consumable 32) based on the consumable being in the second receiving chamber 12.

In some example embodiments, at least one receiving chamber (e.g., first receiving chamber 11) of the first receiving chamber 11 or the second receiving chamber 12 includes a heater 99 configured to heat a consumable accommodated in the at least one receiving chamber. In FIG. 3, the heater 99 is shown to be flush with the inner surface of the receiving chamber 11, but it will be understood that the heater 99 may be included in the receiving chamber in various configurations. For example, the heater 99 may be located at the base of receiving chamber 11, distal from the opening of the receiving chamber 11 to the external environment and proximate to the internal power source 16. In some example embodiments, the heater 99 may be flush with, protrude from, and/or be recessed into one or more inner surfaces of the receiving chamber in which the heater 99 is included.

As may be seen by comparison of FIG. 2 and FIG. 3, there is no change in size of the device by the replacement of the consumable by the battery. Even if a battery were larger than a consumable or smaller, the device is still convenient for an adult vaper to be used and carried.

Figure 4:
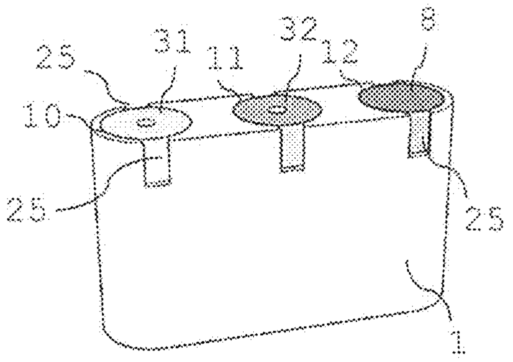
FIG. 4 is a perspective view of an aerosol-generating device comprising two consumables and a battery arranged in parallel in the device, according to some example embodiments.

In some example embodiments, including the example embodiments shown in at least FIG. 4, the device housing 1 includes a third receiving chamber 10 configured to receive and accommodate a third consumable, and the third receiving chamber 10 includes electrical contacts 61 configured to be detachably connected to a separate power source (e.g., battery 8) based on the separate power source being in the third receiving chamber 10.

The aerosol-generating device shown in FIG. 4 comprises a device housing 1 comprising three tubular shaped receiving chambers 10, 11, 12 accommodating two consumables 31, 32 and a separate battery 8. The consumables 31, 32 as well as the battery 8 are tubular shaped and are completely inserted in the receiving chambers 10, 11, 12 chambers when accommodated therein. The proximal ends of the consumables as well as of the external battery are arranged flush with the top of the device housing 1.

The two consumables 31, 32 as well as the separate battery 8 are arranged parallel next to each other and in one line in the device housing 1. The device housing has a rectangular shape with rounded edges.

Restated, at least the first receiving chamber 11 and the second receiving chamber 12 extend in parallel in the device housing 1. In contrast, as shown in at least FIGS. 1-3, the first receiving chamber 11 and the second receiving chamber 12 are at opposite ends of the device housing 1.

Preferably, the consumables 31, 32 are aerosol-generating articles comprising aerosol-forming substrate. The consumables 31, 32 may be different types of consumables or may be the same type of consumables. The first consumable 31 may, for example, be a heatable aerosol-forming liquid containing cartridge, for example a cartomizer where an atomization source is incorporated in the cartridge. The second consumable 32 may, for example, be a heatable tobacco material containing article.

The receiving chamber walls of the receiving chambers 10, 11, 12 each comprise two opposite and longitudinally arranged slits 25. The consumables 31, 32 and the separate battery 8 may be removed from the receiving chambers by gripping the consumable and the battery via the slits 25.

Figure 5:
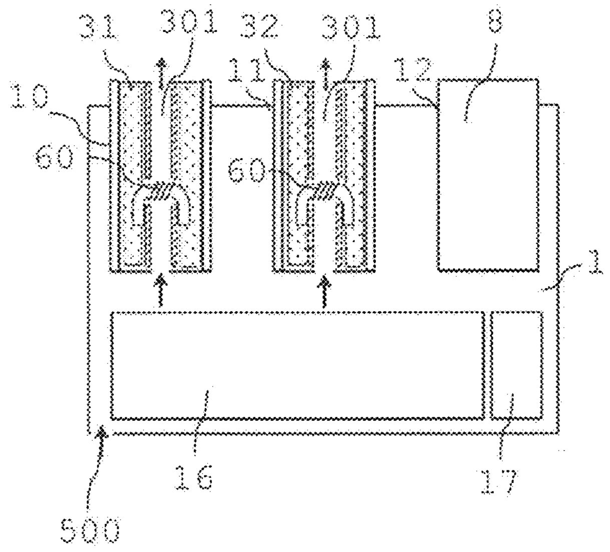
FIG. 5 shows a cross section through the device of FIG. 4 and an airflow through same kind of consumables, according to some example embodiments.

FIG. 5 schematically shows a cross section through an aerosol-generating device comprising two consumables and a separate battery 8 arranged in parallel, for example an embodiment of the device as shown in FIG. 4.

FIG. 5 also shows an example of airflows passing through the two consumables.

The device housing 1 comprise three receiving chambers arranged in parallel, two consumables 31, 32 and a separate battery 8 accommodated in the receiving chambers, a power source 16 and a controller 17 for controlling the power source and the device.

In FIG. 5 the two consumables 31, 32 are of a same type. The two consumables are a heated liquid containing cartridge. An aerosol-forming liquid is contained in a hollow tubular shaped reservoir. The liquid is supplied by a wick material to a coil heater 60, where the liquid is heated and evaporated. In a central conduit 301 of the consumables, the evaporated liquid is led out of the receiving chamber.

The two cartomizers preferably differ in terms of at least one of nicotine strength, flavor or vapor volume.

The receiving chambers 10, 11 comprise electrical contacts (not shown) for providing power from the internal power source 16 to the coil heater 60 of the consumables 31, 32.

The receiving chamber 12 comprises electrical contacts (not shown) for providing additional power from the external battery 8 to the device. Preferably, the electrical contacts of the third receiving chamber 12 are connected to the electrical contacts of the first and of the second receiving chambers 10, 11 to directly provide power from the external battery 8 to the coil heater 60 of the consumables 31, 32.

Preferably, the consumables 31, 32 are heated individually and only the one consumable an adult vaper is drawing air on provides substances to an airflow 500 to be drawn by the adult vaper.

An airflow 500 enters the device through one opening at a distal end of the device (bottom wall), passes through the device housing 1 and may enter the distal end of a receiving chamber. The airflow 500 passes the receiving chamber and through the consumable accommodated in the receiving chamber. Thereby the airflow 500 picks up evaporated substances.

The airflow 500 may then pass through a mouthpiece (not shown), which is aligned with the respective consumable and receiving chamber.

The controller 17 of the device is configured to provide required power to a coil heater 60. The controller is also configured to control power from the separate battery 8 to the coil heaters 60.

A detection system in the device may be integrated or connected to the controller 17 and may recognize the type of consumable accommodated in the receiving chambers and the presence of a battery in the receiving chamber. For example, next to an electronic recognition, a touch sensor may be provided in the receiving chamber for recognition of the presence or absence of a consumable or a battery.

Wiring and control of the device may be configured such that also a consumable may be accommodated and operated in the third receiving chamber. Wiring and control of the device may be configured such that also a separate battery may be accommodated in any one of the first or second receiving chambers 10, 11 for providing additional power.

In particular, a separate battery may be provided in receiving chamber 12 as well as in one of the other receiving chambers 10, 11.

Figure 6:
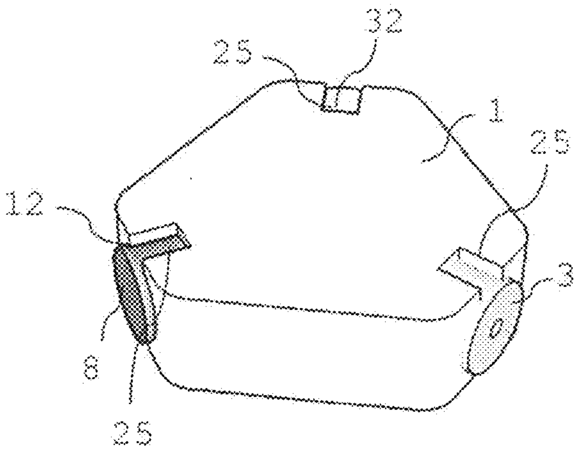
FIG. 6 shows a triangular-shaped device comprising cutouts for access to two consumables and a battery arranged in a star shape in the device, according to some example embodiments.
Figure 7:
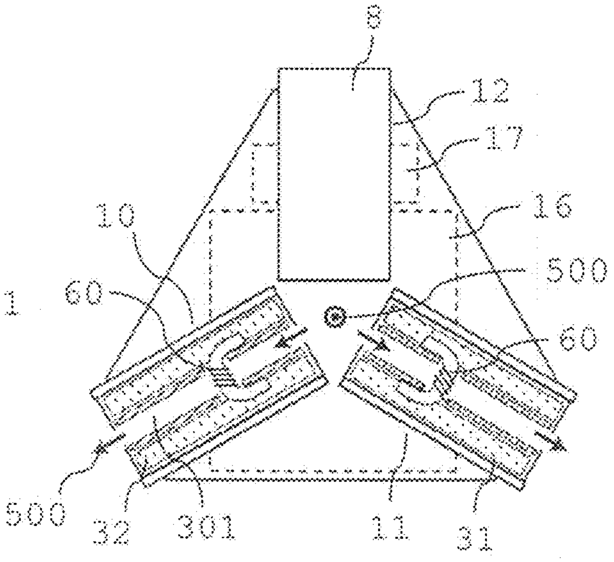
FIG. 7 shows a cross section through the triangular-shaped device of FIG. 6 and an airflow through same kind of consumables, according to some example embodiments.

In some example embodiments, including the example embodiments shown in at least FIGS. 6-7, at least the first receiving chamber 11 and the second receiving chamber 12 are arranged in the device housing 1 such that a longitudinal axis of the first receiving chamber 11 and the second receiving chamber 12 collectively define an alignment angle (e.g., 120 degrees as shown in at least FIGS. 6-7).

FIG. 6 shows a triangular-shaped housing 1 with two consumables 31, 32 and a separate battery 8. The housing is symmetric and the consumables and the battery are regularly arranged in a star-shaped manner in the device housing 1. The longitudinal axis of the consumables and of the battery each include ("collectively define) an angle ("alignment angle") of 120 degree.

The receiving openings of the receiving chambers 10, 11, 12 are arranged at the three corners of the triangle forming the device housing 1. Thus, the receiving chambers 10, 11, 12 are arranging in a star-like pattern in the device housing 1.

Each of the receiving chambers 12 are provided with two opposite and longitudinally arranged slits 25. The three receiving chambers are arranged in the form of a star in the device housing 1.

FIG. 7 schematically shows a cross section through an aerosol-generating device comprising two consumables 31, 32 and a separate battery 8 arranged in a regular star shape, for example an embodiment of the device as shown in FIG. 6.

FIG. 7 also shows an example of airflows passing through the two consumables.

The device housing 1 comprises three receiving chambers arranged in a star shape including an angle of 120 degree between each of the longitudinal axis of the receiving chambers. The device housing 1 also comprises two consumables 31, 32 and an additional battery 8 accommodated in the receiving chambers, an internal power source 16 and a controller 17 for controlling the power source and the device.

The device housing is provided with a central air inlet arranged in the center of the triangle on one large side of the device housing 1. An airflow 500 entering the device through this central air inlet passes radially into the direction of two corners of the triangle. Thereby the airflow passes through a consumable accommodated in the receiving chamber.

The airflow 500 may also pass through a mouthpiece aligned with the respective consumable and receiving chamber (not shown).

In the embodiment of FIG. 7 power source 16 and controller 17 are basically arranged in a layer parallel to the receiving chambers and parallel to one large side of the device housing 1.

In FIG. 7 the two consumables 31, 32 are of a same type. The two consumables are a heated liquid containing cartridge. An aerosol-forming liquid is contained in a hollow tubular shaped reservoir. The liquid is supplied by a wick material to a coil heater 60, where the liquid is heated and evaporated. In a central conduit 301 of the consumables, the evaporated liquid is led out of the receiving chamber. The two cartomizers preferably differ in terms of at least one of nicotine strength, flavor or vapor volume.

The receiving chambers 10, 11, 12 comprise electrical contacts (not shown). In the arrangement of FIG. 7, receiving chambers 10, 11 comprise electrical contacts for receiving power from the internal power source 16 or from the battery 8 to the coil heaters 60 of the consumables 31, 32. The receiving chamber 12 comprises electrical contacts for providing power from the battery 8 to any one or both consumables 31, 32 in the receiving chambers 10, 11.

The controller 17 of the device is configured to provide required power to the coil heater 60 of the consumables.

A detection system in the devices may be integrated or connected to the controller 17 and may recognize the type of consumable accommodated in the receiving chambers or the presence of a battery. For example, next to an electronic recognition, a touch sensor may be provided in the receiving chamber to generate signals that may be processed by a processor included in the detection system to enable the processor to determine ("recognize") the presence or absence of a consumable or of a battery 8 based on processing one or more signals received at the processor from the touch sensor.

The invention claimed is:

1. An aerosol-generating device, comprising:

a device housing defining a first receiving chamber, a second receiving chamber, and an internal space, the first receiving chamber being configured to receive and accommodate a first consumable, the second receiving chamber being configured to receive and accommodate a second consumable or a separate power source;

an internal power source within the internal space defined by the device housing, the internal power source being configured to provide power to the aerosol-generating device; and a controller configured to control aerosolization of an aerosol-forming substrate of at least one consumable of the first consumable and the second consumable, wherein the second receiving chamber includes electrical contacts configured to be detachably connected to the separate power source, to provide additional power from the separate power source to the aerosol-generating device, wherein the internal power source is configured to power both the first consumable and the second consumable when the first consumable is housed in the first receiving chamber concurrently with the second consumable being housed in the second receiving chamber, and wherein a receiving chamber wall of the first receiving chamber or a receiving chamber wall of the second receiving chamber includes slits.

2. The aerosol-generating device according to claim 1, wherein the first receiving chamber includes additional electrical contacts configured to be detachably connected to the separate power source based on the separate power source being in the first receiving chamber.

3. The aerosol-generating device according to claim 1, wherein the controller is configured to control a supply of power from the internal power source to the first consumable in the first receiving chamber, and control a separate supply of power from the separate power source to the first consumable in the first receiving chamber.

4. The aerosol-generating device according to claim 1, wherein:

the controller is configured to selectively switch between supplying power to the first receiving chamber from the internal power source or from the separate power source.

5. The aerosol-generating device according to claim 1, wherein at least one receiving chamber of the first receiving chamber or the second receiving chamber includes a heater configured to heat a consumable accommodated in the at least one receiving chamber.

6. The aerosol-generating device according to claim 1, wherein at least one receiving chamber of the first receiving chamber or the second receiving chamber includes electrical contacts configured to connect the internal power source to a heater of a consumable in the at least one receiving chamber.

7. The aerosol-generating device according to claim 1, wherein dimensions of the first receiving chamber and dimensions of the second receiving chamber are equal.

8. The aerosol-generating device according to claim 1, wherein dimensions of the first consumable and dimensions of the separate power source are equal.

9. The aerosol-generating device according to claim 1, wherein the electrical contacts configured to be detachably connected to the separate power source in the second receiving chamber are further configured to connect the internal power source to a heater of the second consumable based on the second consumable being in the second receiving chamber.

10. The aerosol-generating device according to claim 1, wherein the first receiving chamber and the second receiving chamber extend in parallel in the device housing.

11. The aerosol-generating device according to claim 1, wherein the first receiving chamber and the second receiving chamber are at opposite ends of the device housing.

12. The aerosol-generating device according to claim 1, wherein the first receiving chamber and the second receiving chamber are arranged in the device housing such that a longitudinal axis of the first receiving chamber and the second receiving chamber includes an alignment angle.

13. The aerosol-generating device according to claim 1, wherein the receiving chamber wall of the second receiving chamber includes two opposite and longitudinally arranged slits configured to facilitate removal of one of the second consumable or the separate power source.

14. The aerosol-generating device according to claim 1, wherein the receiving chamber wall of the first receiving chamber or the receiving chamber wall of the second receiving chamber includes two opposite and longitudinally arranged slits configured to facilitate removal of the first consumable or one of the second consumable or the separate power source.

* * * * *